US012664154B2

(12) United States Patent
Koneru et al.

(10) Patent No.: US 12,664,154 B2
(45) Date of Patent: Jun. 23, 2026

(54) SYSTEMS AND METHODS FOR ENABLING CONVERSATIONAL INTERACTION WITH DATA TABLES

(71) Applicant: Kore.ai, Inc., Orlando, FL (US)

(72) Inventors: Rajkumar Koneru, Windermere, FL (US); Prasanna Kumar Arikala Gunalan, Hyderabad (IN); Pattabhi Rama Rao Dasari, Hyderabad (IN); Shubhangan Das, West Bengal (IN)

(73) Assignee: Kore.ai, Inc., Orlando, FL (US)

( * ) Notice: Subject to any disclaimer, the term of this patent is extended or adjusted under 35 U.S.C. 154(b) by 0 days.

(21) Appl. No.: 18/785,510

(22) Filed: Jul. 26, 2024

(65) Prior Publication Data

US 2026/0030240 A1 Jan. 29, 2026

(51) Int. Cl.
| | |
|---|---|
| *G06F 16/242* | (2019.01) |
| *G06F 16/22* | (2019.01) |
| *G06F 16/9032* | (2019.01) |

(52) U.S. Cl.
CPC ........ *G06F 16/243* (2019.01); *G06F 16/2282* (2019.01); *G06F 16/90324* (2019.01)

(58) Field of Classification Search
None
See application file for complete search history.

(56) References Cited

U.S. PATENT DOCUMENTS

| | | | | |
|---|---|---|---|---|
| 11,269,938 | B2 * | 3/2022 | Vora | G06F 16/168 |
| 2022/0343901 | A1 * | 10/2022 | Koneru | G10L 15/22 |
| 2023/0169273 | A1 * | 6/2023 | Koneru | G06F 40/30 |
| | | | | 704/9 |
| 2025/0068627 | A1 * | 2/2025 | Hoang | G06F 16/24573 |
| 2025/0111162 | A1 * | 4/2025 | Hu | G06F 40/35 |
| 2025/0200098 | A1 * | 6/2025 | Halyal | G06F 40/30 |
| 2025/0328536 | A1 * | 10/2025 | Gadit | G06F 16/24578 |
| 2025/0328914 | A1 * | 10/2025 | Opedal | G06V 30/19173 |
| 2025/0335775 | A1 * | 10/2025 | Badjatiya | G06N 3/0455 |

* cited by examiner

*Primary Examiner* — Giuseppi Giuliani
(74) *Attorney, Agent, or Firm* — Troutman Pepper Locke LLP

(57) ABSTRACT

A method for enabling users to conversationally interact with a data table comprises receiving by a virtual assistant server from a user device, a natural language query targeted at a data table. The virtual assistant server determines one or more table intents or one or more table sub-intents of the natural language query. The virtual assistant server determines one or more table operations to execute on the data table based on the determined table intents or table sub-intents. The virtual assistant server iteratively executes each of the determined table operations on the data table, where a final version of the data table results after completion of one or more of the iteratively executed determined table operations. Subsequently, the virtual assistant server determines a response to the natural language query based on the final version of the data table and outputs the determined response to the natural language query to the user device.

18 Claims, 8 Drawing Sheets

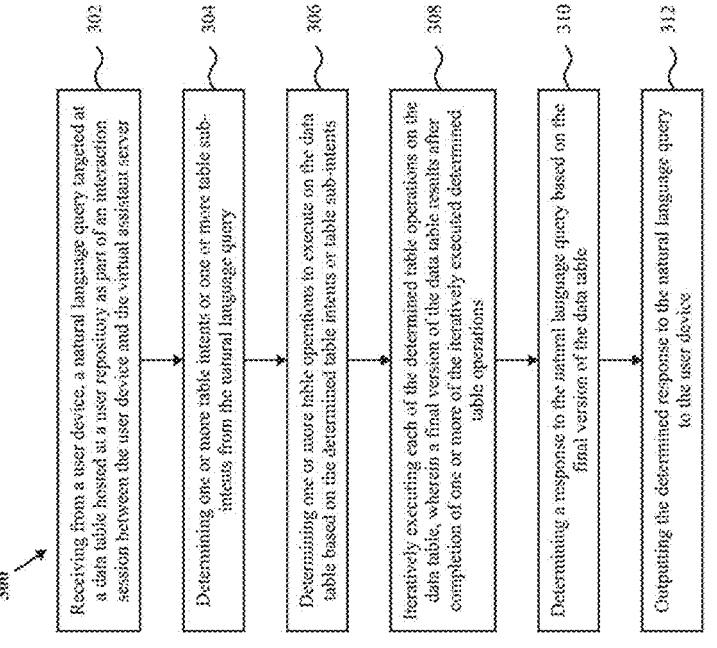

302 — Receiving from a user device, a natural language query targeted at a data table hosted at a user repository as part of an interaction session between the user device and the virtual assistant server 304 — Determining one or more table intents or one or more table sub-intents from the natural language query 306 — Determining one or more table operations to execute on the data table based on the determined table intents or table sub-intents 308 — Iteratively executing each of the determined table operations on the data table, wherein a final version of the data table results after completion of one or more of the iteratively executed determined table operations 310 — Determining a response to the natural language query based on the final version of the data table 312 — Outputting the determined response to the natural language query to the user device

SYSTEMS AND METHODS FOR ENABLING CONVERSATIONAL INTERACTION WITH DATA TABLES

FIELD

This technology generally relates to querying data tables, and more particularly to methods, systems, and computer-readable media for enabling conversational interaction with data tables.

BACKGROUND

Traditional methods of interacting with data tables, such as, for example, using text-to-SQL (Structured Query Language) techniques present significant challenges such as, for example, inaccurately interpreting and translating complex natural language queries into SQL queries, lack of contextual understanding, or the like, which may potentially lead to failed operations or presenting incorrect results to users.

Large Language Models (LLMs) offer superior language understanding and the ability to handle complex queries and user interactions than text-to-SQL systems. However, with the existing techniques of leveraging LLMs, the entire data of the data tables has to be exposed to LLMs to answer user queries from data tables, which pose data privacy and security issues for enterprises or users, especially when proprietary and/or confidential information is stored in the data tables. Further, relying on LLMs for answers can cause issues such as hallucination and bias, potentially leading to incorrect outcomes. Furthermore, while LLMs are good at processing unstructured text, their ability to handle structured data, such as that found in data tables, is limited.

Hence, there exists a need for improved systems and methods for interacting with data tables in a more efficient and secure manner.

SUMMARY

In one example, the present disclosure relates to a method for enabling conversational interaction with data tables. The method implemented by a virtual assistant server comprises receiving from a user device, a natural language query targeted at a data table hosted at a user repository as part of an interaction session between the user device and the virtual assistant server. Further, one or more table intents or one or more table sub-intents are determined from the natural language query. Further, one or more table operations to execute on the data table are determined based on the determined table intents or table sub-intents. Further, each of the determined table operations are iteratively executed on the data table, where a final version of the data table results after completion of one or more of the iteratively executed determined table operations. Furthermore, a response to the natural language query is determined based on the final version of the data table. Subsequently, the determined response to the natural language query is output to the user device.

In another example, the present disclosure relates to a virtual assistant server comprising one or more processors and a memory. The memory coupled to the one or more processors which are configured to execute programmed instructions stored in the memory to receive from a user device, a natural language query targeted at a data table hosted at a user repository as part of an interaction session between the user device and the virtual assistant server. Further, one or more table intents or one or more table sub-intents are determined from the natural language query. Further, one or more table operations to execute on the data table are determined based on the determined table intents or table sub-intents. Further, each of the determined table operations are iteratively executed on the data table, where a final version of the data table results after completion of one or more of the iteratively executed determined table operations. Furthermore, a response to the natural language query is determined based on the final version of the data table. Subsequently, the determined response to the natural language query is output to the user device.

In another example, the present disclosure relates to a non-transitory computer readable storage medium storing thereon instructions which when executed by one or more processors, causes the one or more processors to receive from a user device, a natural language query targeted at a data table hosted at a user repository as part of an interaction session between the user device and the virtual assistant server. Further, one or more table intents or one or more table sub-intents are determined from the natural language query. Further, one or more table operations to execute on the data table are determined based on the determined table intents or table sub-intents. Further, each of the determined table operations are iteratively executed on the data table, where a final version of the data table results after completion of one or more of the iteratively executed determined table operations. Furthermore, a response to the natural language query is determined based on the final version of the data table. Subsequently, the determined response to the natural language query is output to the user device.

BRIEF DESCRIPTION OF THE DRAWINGS

FIG. 3 is a flowchart of an exemplary method for enabling conversational interaction with a data table.

DETAILED DESCRIPTION

Figure 1A:
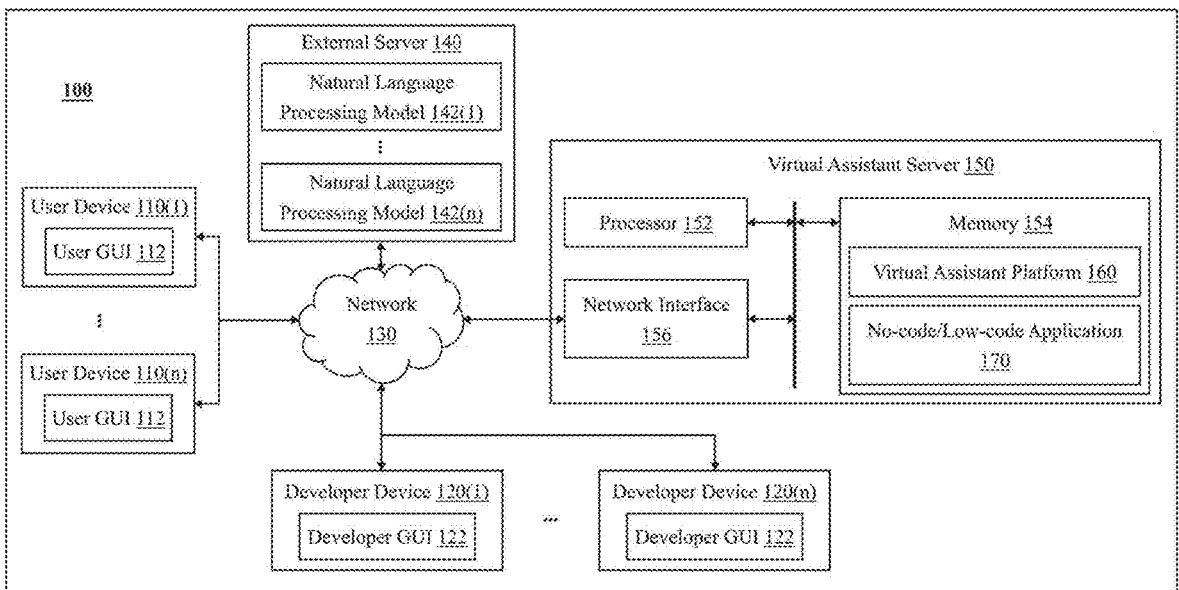
FIG. 1A is a block diagram of an exemplary environment for implementing the concepts and technologies disclosed herein.

Examples of the present disclosure relate to an environment 100 illustrated in FIG. 1A and, more particularly, to one or more components, systems, computer-readable media and methods for enabling users to efficiently and securely interact conversationally with data tables. The environment 100 enables developers or administrators of enterprises to, by way of example, design, develop, deploy, manage, host, and/or analyze virtual assistants. In one example, users may interact with one or more of these virtual assistants to conversationally interact with data tables. Further, the environment 100 enables the developers or the administrators of the enterprises to, by way of example, train, optimize and/or use LLMs for different enterprise applications.

FIG. 1A is a block diagram of an exemplary environment 100 for implementing the concepts and technologies disclosed herein. The environment 100 includes: one or more user devices 110(1)-110(*n*); one or more developer devices 120(1)-120(*n*); an external server 140; and a virtual assistant server 150 all coupled together via a network 130, although the environment 100 may include other types and numbers of systems, devices, components, and/or elements and in other topologies and deployments. Although not illustrated, the environment 100 may include additional network components, such as routers, switches, and other devices, which are well known to those of ordinary skill in the art and thus will not be described here.

The one or more user devices 110(1)-110(*n*) may comprise one or more processors, one or more memories, one or more input devices such as a keyboard, a mouse, a display device, a touch interface, and/or one or more communication interfaces, which may be coupled together by a bus or other any other wired or wireless communication link, although the one or more user devices 110(1)-110(*n*) may have other types and/or numbers of other systems, devices, components, and/or other elements. The users accessing with the one or more user devices 110(1)-110(*n*) provide inputs/ utterances (e.g., in text, voice, or by other means) to the virtual assistant server 150 via a user graphical user interface (GUI) 112, hereinafter referred to as "user GUI 112", although other manners for accessing and interacting may be used. The user GUI 112 may comprise interfaces of one or more virtual assistants hosted and/or managed by the virtual assistant server 150. The virtual assistant server 150 provides responses to the utterances via the virtual assistants. In one example, the virtual assistant server 150 communicates with the external server 140 to provide responses to the utterances.

The users at the one or more user devices 110(1)-110(*n*) may access and interact with the functionalities exposed by the virtual assistant server 150 via the network 130. The one or more user devices 110(1)-110(*n*) may include any type of computing device that can facilitate user interaction, for example, a desktop computer, a laptop computer, a tablet computer, a smartphone, a mobile phone, a wearable computing device, or any other type of device with communication and data exchange capabilities. The one or more user devices 110(1)-110(*n*) may include software and hardware capable of communicating with the virtual assistant server 150 via the network 130. Also, the one or more user devices 110(1)-110(*n*) may render and display the information received from the virtual assistant server 150 via the user GUI 112.

The users at the one or more user devices 110(1)-110(*n*) may interact with the virtual assistant server 150 via the network 130 by providing text utterances, voice utterances, or a combination of text and voice utterances via the user GUI 112. It may be understood that to support voice-based communication channels, the environment 100 may include, for example, a public switched telephone network (PSTN), a voice server, a text-to-speech (TTS) engine, and/or an automatic speech recognition (ASR) engine.

The one or more developer devices 120(1)-120(*n*) may communicate with the virtual assistant server 150 and/or the external server 140 via the network 130. The one or more developers at the one or more developer devices 120(1)-120 (*n*) may access and interact with the functionalities exposed by the virtual assistant server 150 and/or the external server 140 via the one or more developer devices 120(1)-120(*n*). The one or more developer devices 120(1)-120(*n*) may include any type of computing device that can facilitate user interaction, for example, a desktop computer, a laptop computer, a tablet computer, a smartphone, a mobile phone, a wearable computing device, or any other type of device with communication and data exchange capabilities. The one or more developer devices 120(1)-120(*n*) may include software and hardware capable of communicating with the virtual assistant server 150 and/or the external server 140 via the network 130. Also, the one or more developer devices 120(1)-120(*n*) may comprise a developer graphical user interface (GUI) 122, hereinafter referred to as "developer GUI 122", to render and display the information received from the virtual assistant server 150 and/or the external server 140.

The one or more developer devices 120(1)-120(*n*) may communicate with the virtual assistant server 150 and/or the external server 140 via one or more application programming interfaces (APIs) or one or more hyperlinks exposed by the virtual assistant server 150 and/or the external server 140 respectively, although other types and/or numbers of communication methods may be used in other configurations. The one or more developer devices 120(1)-120(*n*) may run applications, such as web browsers or virtual assistant building tools, which may render the developer GUI 122, although other types and/or numbers of applications may render the developer GUI 122 in other configurations. The one or more developers at the one or more developer devices 120(1)-120(*n*) may, by way of example, make selections, provide inputs using the developer GUI 122 or interact, by way of example, with data, icons, widgets, or other components displayed in the developer GUI 122.

The network 130 enables the one or more user devices 110(1)-110(*n*), the one or more developer devices 120(1)-120(*n*), the external server 140, or other such devices to communicate with the virtual assistant server 150. The network 130 may be, for example, an ad hoc network, an extranet, an intranet, a wide area network (WAN), a virtual private network (VPN), a local area network (LAN), a wireless LAN (WLAN), a wireless WAN (WWAN), a metropolitan area network (MAN), internet, a portion of the internet, a portion of the public switched telephone network (PSTN), a cellular telephone network, a wireless network, a Wi-Fi network, a worldwide interoperability for microwave access (WiMAX) network, or a combination of two or more such networks, although the network 130 may include other types and/or numbers of networks in other topologies or configurations.

The network 130 may support protocols such as, Session Initiation Protocol (SIP), Hypertext Transfer Protocol (HTTP), Hypertext Transfer Protocol Secure (HTTPS), Media Resource Control Protocol (MRCP), Real Time Transport Protocol (RTP), Real-Time Streaming Protocol (RTSP), Real-Time Transport Control Protocol (RTCP), Session Description Protocol (SDP), Web Real-Time Communication (WebRTC), Transmission Control Protocol/Internet Protocol (TCP/IP), User Datagram Protocol (UDP), or Voice over Internet Protocol (VoIP), although other types and/or numbers of protocols may be supported in other topologies or configurations. The network 130 may also support standards or formats such as, for example, hypertext markup language (HTML), extensible markup language (XML), voice extensible markup language (voiceXML), call control extensible markup language (CCXML), JavaScript object notation (JSON), although other types and/or numbers of data, media, and document standards and formats may be supported in other topologies or configurations. The network interface 156 of the virtual assistant server 150 may include any interface that is suitable to connect with any of the above-mentioned network types and communicate using any of the above-mentioned network protocols, standards, or formats.

The external server 140 may host and/or manage one or more natural language processing (NLP) models 142(1)-142 (*n*) such as, for example, transformer based models, generative pre-trained transformers (GPT) models, or the like which process, understand and can generate natural language text. The external server 140 may create, host, deploy, and/or manage the one or more NLP models 142(1)-142(n) based on inputs provided by the one or more developers using the one or more developer devices 120(1)-120(n). In one example, the developer at the developer device 120(1) may provide one or more inputs to train the one or more NLP models 142(1)-142(n).

The external server 140 may be a cloud-based server, an on-premises server, a hybrid server, a virtual server, a high performance computing server, a load balanced server, a virtual private server, although the external server 140 may comprise other types and/or numbers of servers in other configurations. The developers at the one or more developer devices 120(1)-120(n) and/or the virtual assistant server 150 may access the functionalities of the one or more NLP models 142(1)-142(n) via one or more APIs exposed by the external server 140. In another example, the one or more NLP models 142(1)-142(n) may be hosted by the external server 140 and managed remotely by the virtual assistant server 150. In another example, the one or more NLP models 142(1)-142(n) may be hosted at the virtual assistant server 150 and managed by the virtual assistant server 150.

In one example, the one or more NLP models 142(1)-142 (*n*) may comprise: large language models (LLMs); custom models; small language models; rule-based models; machine learning models (ML); or hybrid models, although other types and/or numbers of models may be used in other examples. For simplicity, hereinafter the one or more NLP models 142(1)-142(n) will be referred to as one or more LLMs 142(1)-142(n). An LLM is a type of neural network model that is used to process natural language data for tasks such as natural language processing, natural language understanding, natural language generation, text mining, text classification, machine translation, text summarization, question-answering, although the LLM may be used for other types and/or numbers of tasks in other examples. The LLM uses deep learning or neural networks to learn language features or data patterns from large amounts of training data, which is then used to generate predictions or features or patterns from unseen data. The LLM can be used to generate language features such as word embeddings, part-of-speech tags, named entity recognition, sentiment analysis, or the like. Unlike traditional rule-based NLP systems, the LLM does not rely on pre-defined rules or templates to generate text or responses. Instead, in one example, the LLM uses a probabilistic approach to generate text, where the LLM calculates the probability of each word in the text based on the patterns the LLM learned from the training data. The LLM may be, for example, a pre-trained general purpose LLM (e.g., LLaMA 2, Claude, Cohere, Mistral 7B, Flan T5, BERT, GPT 3.5, GPT 4, or the like) or a fine-tuned LLM for an enterprise or one or more domains.

The virtual assistant server 150 includes a processor 152, a memory 154, and a network interface 156, although the virtual assistant server 150 may include other types and/or numbers of components in other examples. In addition, the virtual assistant server 150 may include an operating system (not shown). In one example, the virtual assistant server 150, one or more components of the virtual assistant server 150, and/or one or more processes performed by the virtual assistant server 150 may be implemented using a networking environment (e.g., cloud computing environment). In one example, the capabilities of the virtual assistant server 150 may be offered as a service using the cloud computing environment. The virtual assistant server 150 may be a cloud-based server, an on-premises server, a hybrid server, a virtual server, a high performance computing server, a load balanced server, a virtual private server, although the virtual assistant server 150 may comprise other types and/or numbers of servers in other configurations. The virtual assistant server 150 of the environment 100 is configured to orchestrate natural language conversations between users and the virtual assistants.

The components of the virtual assistant server 150 may be coupled together by a bus or any other wired or wireless communication link. The bus may be a graphics bus, a memory bus, an Industry Standard Architecture (ISA) bus, an Extended Industry Standard Architecture (EISA) bus, a Micro Channel Architecture (MCA) bus, a Video Electronics Standards Association (VESA) Local bus, a Peripheral Component Interconnect (PCI) bus, a PCI-Express (PCIe) bus, a serial advanced technology attachment (SATA) bus, a Personal Computer Memory Card Industry Association (PCMCIA) bus, an Small Computer Systems Interface (SCSI) bus, Server PCI Express Module (SXM), or a combination of two or more of these, although other types and/or numbers of buses may be used in other configurations.

The processor 152 of the virtual assistant server 150 may execute one or more computer-executable instructions stored in the memory 154 for the methods illustrated and described with reference to the examples herein, although the processor 152 may execute other types and numbers of instructions and perform other types and numbers of operations. The processor 152 may comprise one or more central processing units (CPUs), one or more graphic processing units (GPUs), or general-purpose processors with a plurality of processing cores, such as Intel® processor(s), AMD® processor(s), or Nvidia, although other types of processor(s) could be used in other configurations. Although the virtual assistant server 150 may comprise multiple processors, only a single processor (i.e., the processor 152) is illustrated in FIG. 1A for simplicity.

The memory 154 of the virtual assistant server 150 is an example of a non-transitory computer readable storage medium capable of storing information or instructions for the processor 152 to operate on. The instructions, which when executed by the processor 152, perform one or more of the disclosed examples. In one example, the memory 154 may be a random access memory (RAM), a dynamic random access memory (DRAM), a static random access memory (SRAM), a persistent memory (PMEM), a non-volatile dual in-line memory module (NVDIMM), a hard disk drive (HDD), a read only memory (ROM), an erasable programmable read-only memory (EPROM), an electrically erasable programmable read-only memory (EEPROM), a programmable ROM (PROM), a flash memory, a compact disc (CD), a digital video disc (DVD), a magnetic disk, a universal serial bus (USB) memory card, a memory stick, or a combination of two or more of these. It may be understood that the memory 154 may include other electronic, magnetic, optical, electromagnetic, infrared or semiconductor based non-transitory computer readable storage medium which may be used to tangibly store instructions, which when executed by the processor 152, perform the disclosed examples. The non-transitory computer readable medium is not a transitory signal per se and is any tangible medium that contains and stores the instructions for use by or in connection with an instruction execution system, apparatus, or device. Examples of the programmed instructions and steps stored in the memory 154 are illustrated and described by way of the description and examples herein.

As illustrated in FIG. 1A, the memory 154 may include instructions corresponding to a virtual assistant platform 160 and a no-code/low-code application 170, although other types and/or numbers of instructions in the form of programs, functions, methods, procedures, definitions, subroutines, or modules may be stored. The memory 154 may also include data structures storing information corresponding to the virtual assistant platform 160 and/or the no-code/low-code application 170. The virtual assistant server 150 receives communications/instructions from one or more users at the one or more user devices 110(1)-110(n) and/or one or more developers at the one or more developer devices 120(1)-120(n) and uses the virtual assistant platform 160 and/or the no-code/low-code application 170 to provide responses to the received communications and/or perform necessary actions based on the received instructions.

The network interface 156 may include hardware, software, or a combination of hardware and software, enabling the virtual assistant server 150 to communicate with the components illustrated in the environment 100, although the network interface 156 may enable communication with other types and/or number of components in other configurations. In one example, the network interface 156 provides interfaces between the virtual assistant server 150 and the network 130. The network interface 156 may support wired or wireless communication. In one example, the network interface 156 may include an Ethernet adapter or a wireless network adapter to communicate with the network 130.

The no-code/low-code application 170 is a development platform that provides tools and/or environment for creating and managing applications by the users with minimal to no programming knowledge. The no-code/low-code application 170 may comprise: visual development environments; pre-built templates; drag-and-drop functionalities; workflow automation; or built-in connectors for integrating with other software, applications, or services, although the no-code/low-code application 170 may offer other types and/or numbers of functionalities in other configurations.

Figure 1B:
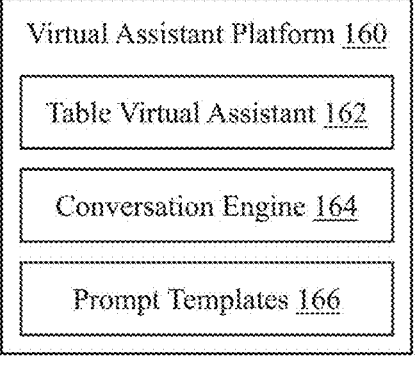
FIG. 1B is a block diagram of a virtual assistant platform of the virtual assistant server illustrated in FIG. 1A.

FIG. 1B is a block diagram of the virtual assistant platform 160 of the virtual assistant server 150 illustrated in FIG. 1A. As illustrated in FIG. 1B, the virtual assistant platform 160 comprises instructions or data corresponding to a table virtual assistant 162, a conversation engine 164, and prompt templates 166, although other types and/or numbers of instructions or data in the form of programs, functions, methods, procedures, definitions, subroutines, modules, or structured or unstructured text, corresponding to other types and/or numbers of components may be stored on the virtual assistant platform 160. Examples of the steps or functions performed when the programmed instructions stored in the memory 154 are executed are illustrated and described by way of the figures and description associated with the examples herein.

The table virtual assistant 162 is a virtual assistant designed, created, configured, and deployed by one or more developers at the developer devices 120(1)-120(n). The users at the one or more user devices 110(1)-110(n) may access the functionalities of the table virtual assistant 162 via a user interface of the table virtual assistant 162 rendered in the user GUI 112 to conversationally interact with the one or more data tables stored on the no-code/low-code application 170. When the users interact conversationally with the one or more data tables by providing one or more natural language queries via the table virtual assistant 162, the virtual assistant server 150 may communicate with the NLP model 142(1), hereinafter referred to as "LLM 142(1)", by providing one or more prompts to generate and output one or more responses to the one or more natural language queries.

In one example, the virtual assistant server 150 may use one or more prompts from the prompt templates 166 to communicate with the LLM 142(1) to generate and output a response to a natural language query provided by a user. A prompt provided to the LLM 142(1) is a specific input text or sequence of instructions designed to elicit an output from the LLM 142(1) based on its trained linguistic and contextual understanding. The one or more developers at the one or more developer devices 120(1)-120(n) may configure the prompt templates 166 via the developer GUI 122 while configuring the table virtual assistant 162, by way of an example. The prompt templates 166 may comprise one or more of: a query suggestion prompt; an intent determination prompt; table operation prompts specific to each of a plurality of table operations (e.g., filter, sort, group by, aggregation, search, pivot table, pie chart, etc.), or an answer prompt, although the prompt templates 166 may comprise any types and/or numbers of other prompts in multiple configurations.

The query suggestion prompt may comprise: metadata associated with a data table that the user is interacting or trying to interact with; one or more instructions and guidelines for generating the query suggestions for the user; or one or more query suggestion examples, although the query suggestion prompt may include other types of information in other examples.

The intent determination prompt may comprise: the natural language query provided by the user; the metadata associated with the data table that the user is interacting with or is trying to interact with; one or more instructions and guidelines for determining one or more table intents and/or one or more table sub-intents of the natural language query; output format; or one or more table intents and/or one or more table sub-intents determination examples, although the intent determination prompt may include other types of information in other examples.

The table operation prompts may comprise: the natural language query provided by the user; the metadata associated with the data table that the user is interacting with or is trying to interact with; one or more instructions and/or guidelines specific to the table operation; output format; or one or more table operation specific examples, although the table operation prompts may include other types of information in other examples.

A table intent is a primary table operation that is performed on the data table in the process of responding to the natural language query of the user. A table sub-intent is a follow-up table operation that is performed on a reference data table that is generated as a result of performing the primary table operation on the data table. For example, the virtual assistant server 150 for the natural language query—"Sort the table by total revenue for the Asia region", determines the table intent as—"filter" and a table sub-intent as—"sort". It may be understood that one or more natural language queries received from one or more users may comprise a table intent but may not comprise any table sub-intent.

Each table intent may have one or more table sub-intents associated with it. For example, for a table intent—"filter", the associated table sub-intents may comprise aggregation or action, although the table intent—filter may comprise other types and/or numbers of associated table sub-intents. Similarly, for a table intent—"aggregation", the associated table sub-intents may comprise: sum; minimum (min); maximum (max); average (avg); percentage; or count, although the aggregation table intent may comprise other types and/or numbers of associated table sub-intents. Similarly, for a table intent—"action", the associated table sub-intents may comprise: sort; sortslice; group by; charts; hide column; delete column; add column; or the like, although the action table intent may comprise other types and/or numbers of associated table sub-intents.

The answer prompt may comprise: the natural language query provided by the user; and one or more instructions and/or guidelines for rephrasing a response determined for the natural language query provided by the user, although the answer prompt may include other types of information in other examples.

The conversation engine 164 orchestrates interaction sessions between the users at the one or more user devices 110(1)-110(n) and the virtual assistant server 150 by executing the table virtual assistant 162 and communicating with the LLM 142(1). The conversation engine 164 orchestrates an interaction session by communicating with various components of the virtual assistant server 150 and the LLM 142(1) to perform various actions (e.g., retrieving relevant data, generating a response to the user's query, transmitting the response to the user, or the like) and routing data between different components of the virtual assistant server 150. Further, the conversation engine 164 may perform various tasks such as, for example, session initialization, session management, or the like, corresponding to each user interaction with the virtual assistant server 150.

The conversation engine 164 creates a new session every time a user initiates an interaction with the table virtual assistant 162 and manages the session until the interaction is complete or ends abruptly for any reason. As part of the session management, the conversation engine 164 stores, tracks, and updates session data such as, for example, session context.

The session context is a memory of an ongoing interaction between the user and the table virtual assistant 162 comprising contextual information that guides the interaction. The session context may comprise: session identifier; the metadata associated with the data table (e.g., data table domain, data table name and identifier, column names, column identifiers, and column types, etc.); current view within the data table (e.g., rows and columns currently visible or selected, any applied filters, any applied sorting, etc.); query history during the session; user preferences and settings (related to how data tables are displayed, queried, or interacted with); or session state (e.g., pending data table operations, queries in progress, etc.), although the session context may comprise any types and/or numbers of other information in other examples. The table virtual assistant 162 and/or the LLM 142(1) can use the session context to understand and provide personalized and efficient responses to user queries.

Figure 1C:
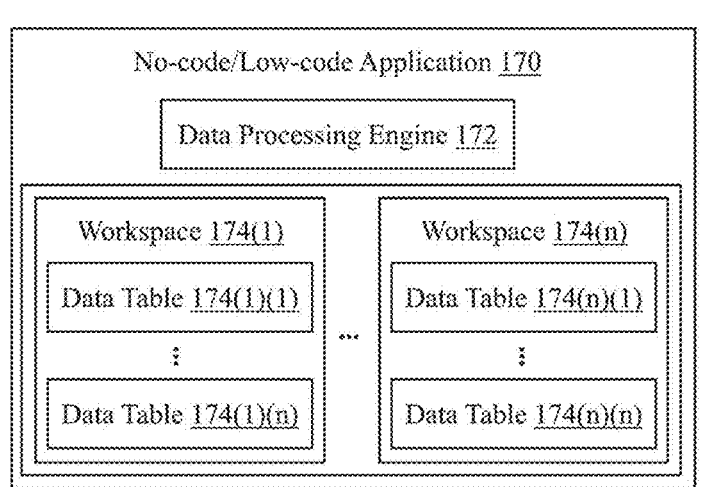
FIG. 1C is a block diagram of a no-code/low-code application of the virtual assistant server illustrated in FIG. 1A.

FIG. 1C is a block diagram of the no-code/low-code application 170 of the virtual assistant server 150 illustrated in FIG. 1A. As illustrated in FIG. 1C, the no-code/low-code application 170 comprises a data processing engine 172 and one or more workspaces 174(1)-174(n). The users at the one or more user devices 110(1)-110(n) may create the one or more workspaces 174(1)-174(n) in the no-code/low-code application 170 and create one or more data tables 174(1)(1)-174(1)(n) to 174(n)(1)-174(n)(n) or other information (e.g., text documents) in the one or more workspaces 174(1)-174(n), as illustrated in FIG. 1C.

In one example, the users at the one or more user devices 110(1)-110(n) may create the one or more data tables 174(1)(1)-174(1)(n) to 174(n)(1)-174(n)(n) or other information in the one or more workspaces 174(1)-174(n) by: building from scratch, using predefined templates, importing data from data sources (e.g., Microsoft excel worksheets, csv files, Google sheets, Jira, HubSpot, Salesforce CRM, etc.). For each of the one or more data tables 174(1)(1)-174(1)(n) to 174(n)(1)-174(n)(n) created in the one or more workspaces 174(1)-174(n), the virtual assistant server 150 generates a data table identifier and associates the generated data table identifier to the corresponding data table. Each data table may comprise a plurality of rows and columns and each row of the plurality of rows may comprise data values in each column, although it may be understood that one or more rows may not comprise any data values in one or more columns. Each column of the plurality of columns in each of the one or more data tables 174(1)(1)-174(1)(n) to 174(n)(1)-174(n)(n) may be associated with a column name and one of a plurality of column types comprising: text, number, single-select, multi-select, currency, date-time, people, email, or the like. Further, for each column created in each of the one or more data tables 174(1)(1)-174(1)(n) to 174(n)(1)-174(n)(n), the virtual assistant server 150 generates a column identifier and associates the column identifier to the corresponding column. Further, in one example, for each of the one or more data tables 174(1)(1)-174(1)(n) to 174(n)(1)-174(n)(n), the user may provide at least one of: a name to the data table, domain of the data table, or brief description of the contents of the data table, although the user may provide other types of information in other examples. The created one or more workspaces 174(1)-174(n), the one or more data tables 174(1)(1)-174(1)(n) to 174(n)(1)-174(n)(n), and other information may be stored as part of user data managed by the no-code/low-code application 170, although the user data may store other types and/or numbers of other information associated with the users.

The data processing engine 172 executes the instructions received from the conversation engine 164 to perform one or more table operations (e.g., filter, sort, group by, aggregation, search, pivot table, pie chart, etc.) on the one or more data tables 174(1)(1)-174(1)(n) to 174(n)(1)-174(n)(n). For example, the conversation engine 164 may instruct the data processing engine 172 to perform on a data table 174(1)(1), a table operation determined based on the natural language query of the user and output a result of the table operation to the data processing engine 172 that is in turn provided as a response to the user by the data processing engine 172.

Figure 2:
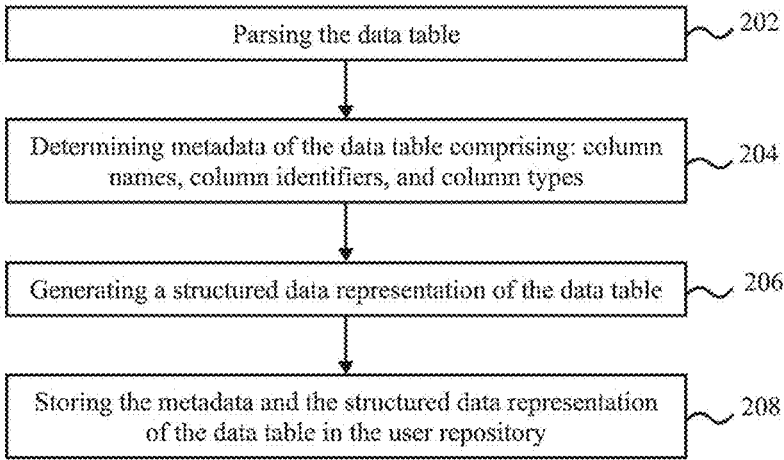
FIG. 2 is a flowchart of an exemplary method for storing metadata and structured data representation of the data table.

FIG. 2 illustrates an exemplary method for storing metadata and structured data representation of the data table. At step 202, the virtual assistant server 150 parses each of the one or more data tables 174(1)(1)-174(1)(n) to 174(n)(1)-174(n)(n) in the one or more workspaces 174(1)-174(n).

At step 204, based on the parsing, the virtual assistant server 150 determines metadata of each of the one or more data tables 174(1)(1)-174(1)(n) to 174(n)(1)-174(n)(n) comprising: data table name; data table domain; column names of the columns; column identifiers of the columns; column types of the columns (e.g., text, number, currency, date and time, people, email, phone number, single select, multi-select, etc.); or description of the data table, although the metadata of the data table may comprise other types and/or numbers of data in other examples.

At step 206, the virtual assistant server 150 generates a structured data representation of each of the one or more data tables 174(1)(1)-174(1)(n) to 174(n)(1)-174(n)(n), such as, for example, a JavaScript Object Notation (JSON) format, although the structured data representation may comprise other types and/or numbers of representations in other examples. Further, each of the one or more data tables 174(1)(1)-174(1)(n) to 174(n)(1)-174(n)(n) is associated with the corresponding metadata and the structured data representation by the virtual assistant server 150.

Subsequently, at step 208, the virtual assistant server 150 stores the metadata, the structured data representation, and the association for each of the one or more data tables 174(1)(1)-174(1)(n) to 174(n)(1)-174(n)(n) in the memory 154.

The user at the user device 110(1) may, for example, access the data table 174(1)(1) in the workspace 174(1) and initiate conversational interaction with the data table 174(1) (1) by providing the natural language query via the table virtual assistant 162. In this example, the table virtual assistant 162 for initiating conversational interaction with the data table 174(1)(1) is available to the user at the data table level, based on which the virtual assistant server 150 responds to the natural language query from the data table 174(1)(1) that the user is currently accessing.

In another example, the table virtual assistant 162 for initiating conversational interaction with the one or more data tables 174(1)(1)-174(1)(n) to 174(n)(1)-174(n)(n) is available to the user at workspace level. In this example, inside each of the one or more workspaces 174(1)-174(n), the table virtual assistant 162 may be available at the workspace level, which enables the user to conversationally interact with the one or more data tables 174(1)(1)-174(1)(n) to 174(n)(1)-174(n)(n) associated with the corresponding workspace. For example, instead of accessing the data table 174(1)(1) of the workspace 174(1) and initiating the conversational interaction, the user at the user device 110(1) may provide the natural language query targeted at the data table 174(1)(1) via the table virtual assistant 162 available at the workspace level in the workspace 174(1). Further, in this example, based on the received natural language query from the user via the table virtual assistant 162, the virtual assistant server 150 may determine that the data table 174(1)(1) of the workspace 174(1) is the target data table to the natural language query.

The virtual assistant server 150 may, for example, using an NLP model, map the natural language query provided by the user via the table virtual assistant 162 available at the workspace level of the workspace 174(1) to metadata of each of the one or more data tables 174(1)(1)-174(1)(n) of the workspace 174(1) and determine one of the one or more data tables 174(1)(1)-174(1)(n) as the target data table (e.g., 174(1)(1)) whose metadata matches with the natural language query of the user. In one example, if the virtual assistant server 150 is not able to determine the target data table in the workspace 174(1), the virtual assistant server 150 may present to the user in the user interface of the table virtual assistant 162 a list of data tables available in the workspace 174(1) and request the user to select the target data table from the list of data tables to continue the conversational interaction. In another example, if the virtual assistant server 150 encounters an ambiguity in determining the target data table among two or more data tables of the workspace 174(1) whose metadata matches with the natural language query of the user, the virtual assistant server 150 may present to the user in the user interface of the table virtual assistant 162 the two or more data tables causing the ambiguity and request the user to select the target data table from the presented two or more data tables to continue the conversational interaction.

The natural language query provided by the user at the user device 110(1) may be, in one example, a text input or a voice input. In another example, the natural language query may be a selection provided by the user at the user device 110(1) from one or more query suggestions that are provided by the virtual assistant server 150 to the user device 110(1) upon user selecting the table virtual assistant 162 available at data table level. In this example, upon the user at the user device 110(1) selecting the table virtual assistant 162 to initiate a conversational interaction with the data table, the virtual assistant server 150 provides a suggestion prompt the LLM 142 comprising: metadata of the data table that the user is currently accessing and trying to conversationally interact with; one or more instructions/rules to the LLM 142 to generate the one or more query suggestions based on the metadata of the data table; or one or more examples disclosing how the query suggestions are to be generated. Further, upon receiving the one or more query suggestions from the LLM 142, the virtual assistant server 150 outputs the one or more query suggestions to the user via the user interface of the table virtual assistant 162 rendered in the user GUI 112 of the user device 110(1). Further, in this example, instead of manually inputting the natural language query, the user at the user device 110(1) may select one of the one or more query suggestions displayed via the user interface of the table virtual assistant 162 to conversationally interact with the data table.

Further, upon the user selecting one of the one or more query suggestions or the user manually inputting the natural language query via the user interface of the table virtual assistant 162, the virtual assistant server 150 using the conversation engine 164 may create and manage an interaction session between the user device 110(1) and the virtual assistant server 150.

FIG. 3 is a flowchart of an exemplary method 300 for enabling conversational interaction with data tables by the virtual assistant server 150 of FIG. 1A. The exemplary method 300 may be performed by the virtual assistant server 150 illustrated in the environment 100 of FIG. 1A. The virtual assistant server 150 may interact with other components of the environment 100 to perform the steps of the exemplary method 300. In FIG. 3, the ordering of steps of method 300 is exemplary, and any other ordering of the steps may be possible, not all the steps may be required, and in some implementations, some steps may be omitted, or other steps may be added.

At step 302, the virtual assistant server 150 receives from a user at a user device 110(1), a natural language query targeted at the data table 174(1)(1) of the workspace 174(1) hosted at the no-code/low-code application 170 as part of an interaction session between the user at the user device 110(1) and the virtual assistant server 150.

At step 304, the virtual assistant server 150 determines one or more table intents or one or more table sub-intents from the natural language query that is received at step 302. Upon receiving the natural language query from the user at the user device 110(1), the conversation engine 164 of the virtual assistant server 150 provides an intent determination prompt from the prompt templates 166 to the LLM 142 to determine the one or more table intents or the one or more table sub-intents from the natural language query. Based on the intent determination prompt, the LLM 142 outputs the determined the one or more table intents or the one or more table sub-intents from the natural language query to the virtual assistant server 150.

At step 306, the virtual assistant server 150 determines one or more table operations to execute on the data table 174(1)(1) based on the determined the one or more table intents or the one or more table sub-intents. To determine the one or more table operations, the conversation engine 164 of the virtual assistant server 150 provides to the LLM 142 a follow-up prompt corresponding to each of the determined table intents and the table sub-intents. Each follow-up prompt comprises: the natural language query received from the user device 110(1); the metadata of the data table 174(1)(1); one or more examples disclosing how to determine the table operation for the table intent or the table sub-intent to which the follow-up corresponds to; and one or more instructions or guidelines to the LLM 142 to determine and output the table operation for the table intent or the table sub-intent to which the follow-up corresponds to. Based on the determined table intents and/or the one or more table sub-intents by the LLM 142, the conversation engine 164 selects the corresponding one or more follow-up prompts from the prompt templates 166 that are pre-configured and stored on the virtual assistant platform 160 by the one or more enterprise users (e.g., developers).

Further, for each follow-up prompt provided, the LLM 142 outputs to the virtual assistant server 150 the table operation for which the follow-up prompt corresponds to, in an output format (e.g., JSON format) specified in the one or more instructions of the follow-up prompt. For example, for a follow-up prompt corresponding to a table intent or a table sub-intent—filter, the LLM 142 may output the filter table operation in the JSON format as below:

```
{"filter":{"title":"","op":"and|or","condition":[{"id":"","filtertype":"","type":
"","filter":""}]}}
```

Similarly, for a follow-up prompt corresponding to a table intent or a table sub-intent—aggregation, the LLM 142 may output the aggregation table operation in the JSON format as below:

```
{"column":[{"id":"","field":"","aggFunc":""}]}
```

Similarly, for a follow-up prompt corresponding to a table intent or a table sub-intent—chart, the LLM 142 may output a chart table operation in the JSON format as below:

```
{"chart":{"title":"","chartType":"","stacked":"true|false","xAxis":{"id":"",
"name":""},"series":[{"id":"","name":"","formula":"sum|average|max|min|
count"}]}}
```

The conversation engine 164 prioritizes providing to the LLM 142, the one or more follow-up prompts corresponding to the table intents over the one or more follow-up prompts corresponding to the table sub-intents. For example, for the natural language query—"Show me the total revenue from the Asia region", the LLM 142 determines the table intent is a "filter" (i.e., region=Asia) and the table sub-intent is an "aggregation" (i.e., to sum the total revenue). In this example, the conversation engine 164 first provides a follow-up prompt corresponding to the filter table intent to the LLM 142 and subsequently provides a follow-up prompt corresponding to the aggregation table sub-intent to the LLM 142. Additionally, based on the natural language query, the LLM 142 may determine an order in which the determined table operations have to be executed on the data table 174(1)(1) to generate the response to the natural language query.

At step 308, the virtual assistant server 150 iteratively executes each of the determined table operations on the data table 174(1)(1), wherein a final version of the data table 174(1)(1) results after completion of one or more of the iteratively executed determined table operations. In one example, each of the determined table operations are executed on the structured data representation of the data table 174(1)(1), i.e., the JSON representation of the data table 174(1)(1). Additionally, the determined table operations are executed on the structured data representation of the data table 174(1)(1), for example, in the order determined by the LLM 142, which results in the final version of the data table 174(1)(1) after completion of one or more of the iteratively executed determined table operations. For the one or more table operations executed on the data table 174(1)(1), a version of the data table 174(1)(1) is iteratively updated and results in the final version of the data table 174(1)(1).

Further, wherever the data table 174(1)(1) is updated by executing the table operations, the virtual assistant server 150 generates and stores a corresponding JSON representation of the updated version of the data table 174(1)(1) in the session context, although the updated versions of the data table 174(1)(1) may be stored in other types and/or numbers of software objects in other examples. For example, the virtual assistant server 150 may generate a new version of the data table 174(1)(1) by performing a first one of the table operations on the structured data representation of the data table 174(1)(1). Further, the virtual assistant server 150 iteratively updates the new version of the data table 174(1)(1) by performing subsequent ones of the table operations on the previously generated versions of the data table 174(1)(1), which results in generation of the final version of the data table 174(1)(1) after executing all the table operations.

The data processing engine 172 of the virtual assistant server 150 may use, for example, one or more JavaScript libraries (e.g., lodash, D3.js, data-forge, pivottable.js, chart.js, highcharts, or the like) to perform the table operations received from the LLM 142 on the structured data representation of the data table 174(1)(1) (e.g., JSON representation), although the virtual assistant server 150 may use other types and/or numbers of libraries and/or tools in various programming languages for performing table operations, like filtering, grouping, aggregation, pivoting, charting, or the like on the structured data representation of the data table 174(1)(1). For example, for a determined table operation—filter, the data processing engine 172 may make a function call of the JavaScript library—"lodash" and passes on the values received from the LLM 142 as attributes of the lodash function call, which performs the filter operation on the JSON representation of the data table 174(1)(1).

At step 310, the virtual assistant server 150 determines, using the data processing engine 172, a response to the natural language query based on the final version of the data table 174(1)(1) at step 308. The conversation engine 164 may store the determined response as part of the session context.

Subsequently, at step 312, the virtual assistant server 150 outputs the determined response to the user device 110(1) via the user interface of the table virtual assistant 162 rendered in the user GUI 112 in this example. Additionally, in one example, along with the determined response, the virtual assistant server 150 may also output the final version of the data table 174(1)(1) from which the response was determined via the user interface of the table virtual assistant 162 rendered in the user GUI 112. The process of generating the final version of the data table 174(1)(1) and outputting the response to the user device 110(1) is described further below in detail by way of the figures and description associated with the examples herein. Further, based on the received natural language query, the response may be provided to the user device 110(1) in different formats such as, for example, natural language text, audio, data table view, pivot table, or charts (e.g., pie chart, bar chart, line chart, etc.), although the response may be provided in other types and/or numbers of formats in other examples.

In another example, the virtual assistant server 150 initially generates a new version of the data table 174(1)(1) by executing a first one of the table operations in the determined order on the data table 174(1)(1). Further, in this example, the virtual assistant server 150 iteratively updates the new version of the data table 174(1)(1) by executing subsequent ones of the table operations in the determined order, except for the last one of the table operations, on the new version of the data table 174(1)(1), which results in the final version of the data table 174(1)(1). Subsequently, in this example, the virtual assistant server 150 outputs to the user device 110(1), a result of executing the last one of the table operations in the determined order on the final version of the first data table 174(1)(1), as the response to the natural language query.

Additionally, in one example, the virtual assistant server 150 may store the final version of the data table 174(1)(1) as part of the session context and respond to one or more subsequent natural language queries of the user from the stored final version of the data table 174(1)(1). Thus, it may be understood that the final version of the data table 174(1)(1) generated for the latest natural language query stored as part of the session context may be considered as a reference data table by the virtual assistant server 150 for responding to the one or more subsequent (follow-up) natural language queries received from the user as part of the ongoing interaction session. For example, a final version of the data table 174(1)(1) generated in the process of responding to a first natural language query of the user may be considered as the reference data table for responding to a second natural language query of the user, and a final version of the data table generated in the process of responding to the second natural language query may be considered as the reference data table for responding to a third natural language query of the user, and so on. Additionally, only the final version of the data table 174(1)(1) generated in the process of responding to the natural language query may be stored as part of the session context and all the previously generated versions of the data table 174(1)(1) may be discarded from the session context by the virtual assistant server 150.

Further, in one example, when the virtual assistant server 150 is not able to determine a response to a follow-up natural language query from the reference data table stored as part of the session context, the virtual assistant server 150 considers the data table 174(1)(1) to determine the response to the follow-up natural language query.

Figure 4A:
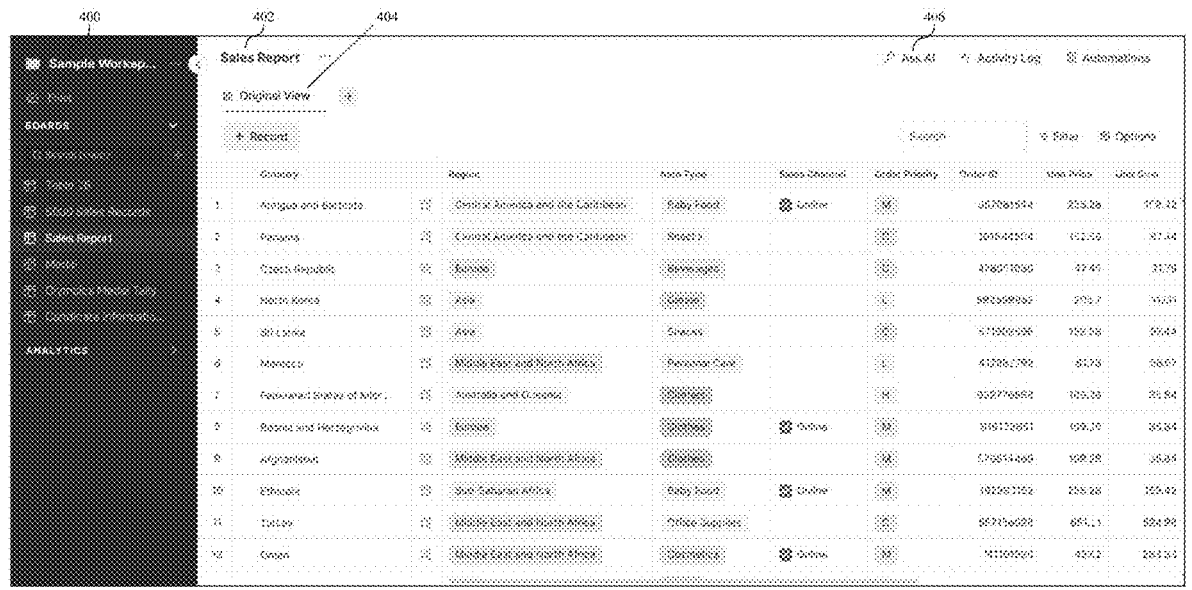
FIGS. 4A-4D are example graphical user interfaces provided by the virtual assistant server on a user device illustrating a no-code/low-code application and a conversational interaction of a user with a data table.
Figure 4B:
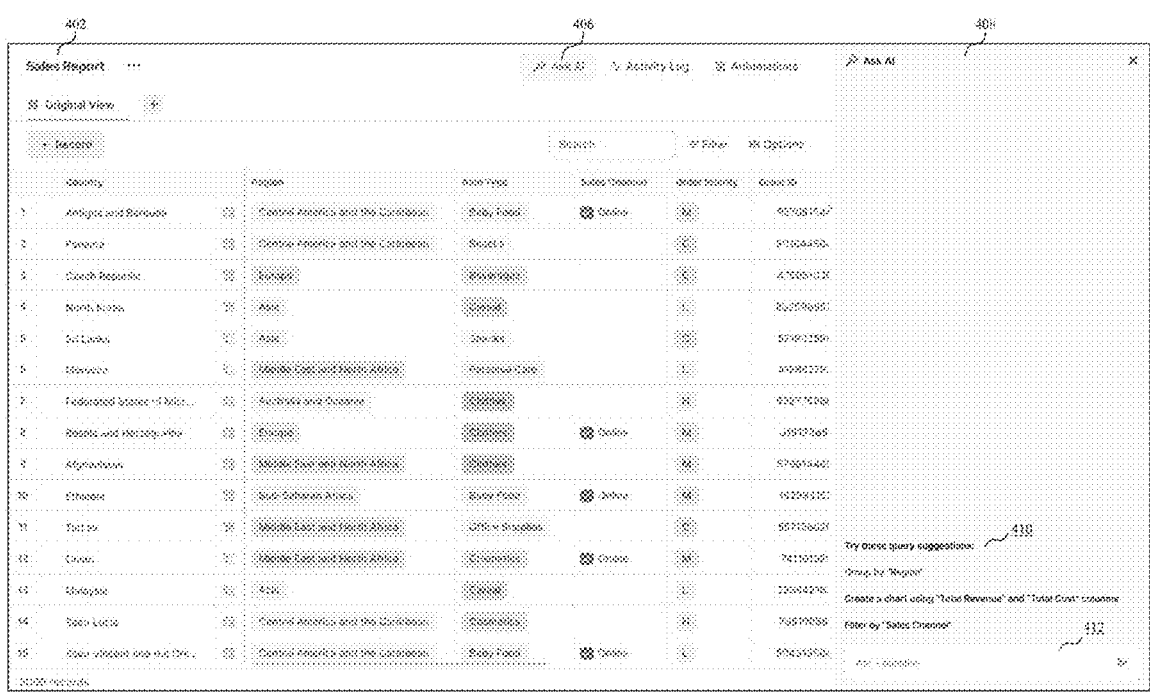
Figure 4C:
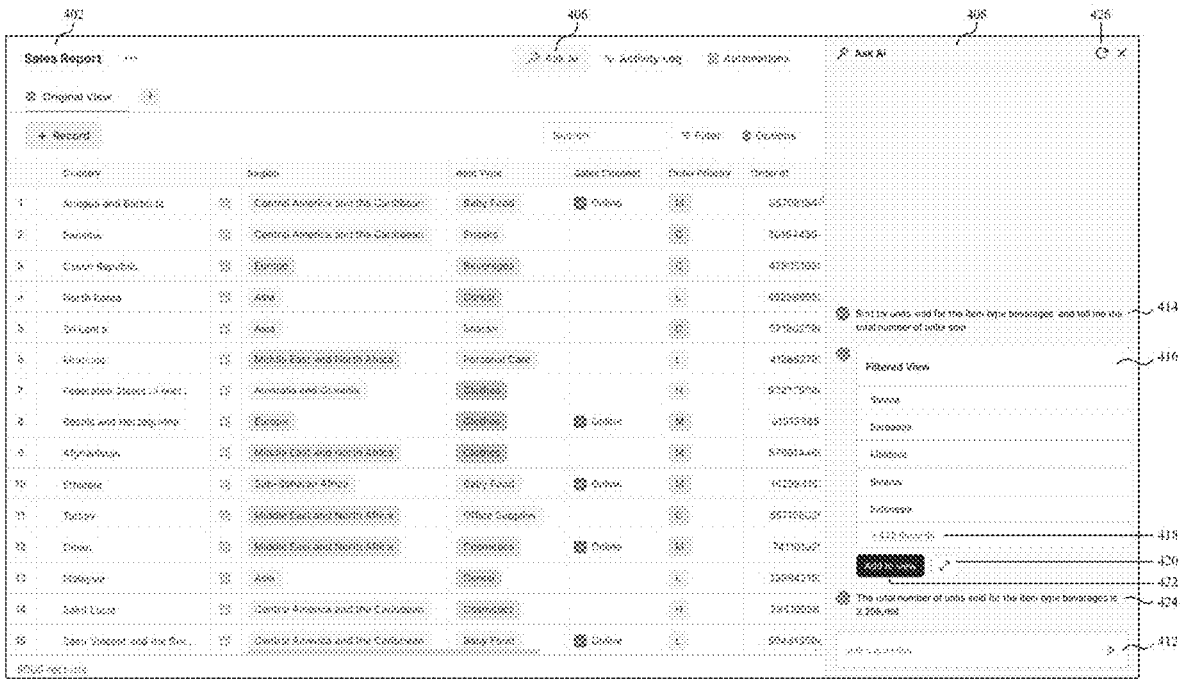

FIGS. 4A-4C are example graphical user interfaces provided by the virtual assistant server 150 on a user device 110(1) illustrating a no-code/low-code application and a conversational interaction of a user with the data table. FIG. 4A is an example graphical user interface of a workspace— "sample workspace 400" provided by the virtual assistant server 150 on the user device 110(1) via the user GUI 112. In one example, the user at the user device 110(1) via a web browser rendered on the user GUI 112 may login to a user account associated with the no-code/low-code application 170 and access the sample workspace 400 (as illustrated in FIG. 4A) from the one or more workspaces created in the no-code/low-code application 170. Further, as illustrated in FIG. 4A, the sample workspace 400 may comprise one or more boards/data tables such as, for example, table 28, sales report, 5000 sales records, Olympics medal tally, or the like, although the sample workspace 400 may comprise any types and/or numbers of boards (e.g., text documents, embedded tables, embedded documents) in other examples.

As illustrated in FIG. 4A, upon the user at the user device 110(1) selecting one of the boards of the sample workspace 400, i.e., sales report 402, which is a data table, the contents of the data table—sales report 402 will be presented to the user in the data table's original view 404. Further, the user at the user device 110(1) may initiate a conversational interaction with the data table—sales report 402 using an option—"Ask AI 406", i.e., the table virtual assistant 162. Hereinafter, for simplicity, the table virtual assistant 162 is referred to as "Ask AI 406".

Referring to FIG. 4B, upon the user at the user device 110(1) selecting the option—"Ask AI 406" to conversationally interact with the data table—sales report 402, the virtual assistant server 150 provides an Ask AI user interface 408. Further, in the Ask AI user interface 408, the virtual assistant server 150 may provide one or more query suggestions— "try these query suggestions 410" to the user for selection.

Referring to FIG. 4C, the user provides a natural language query 414—"Sort by units sold for the item type beverages, and tell me the total number of units sold" to the virtual assistant server 150 via the compose bar 412 (as described at step 302 of FIG. 3) of the Ask AI user interface 408. Upon receiving the natural language query 414, the conversation engine 164 of the virtual assistant server 150 provides the intent determination prompt from the prompt templates 166 to the LLM 142 (as described at step 304 of FIG. 3) to determine the one or more table intents or the one or more table sub-intents of the natural language query 414. In this example, for the natural language query 414, the LLM 142 determines and outputs to the virtual assistant server 150 that the table intent is "filter", and the table sub-intents are "sort" and "aggregation" (not illustrated in FIG. 4C). Further, based on the determined table intent and the table sub-intents, the conversation engine 164 provides the follow-up prompts corresponding to the table intent—filter, table sub-intent—sort, and the table sub-intent—aggregation from the prompt templates 166 to the LLM 142 to determine the corresponding table operations to execute on the sales report 402 (as described at step 306 of FIG. 3). As described above, the LLM 142 may determine and output to the virtual assistant server 150 the order of executing the table operations on the sales report 402 to generate the response to the natural language query. The virtual assistant server 150 may provide the follow-up prompts corresponding to the determined table intent and the table sub-intents to the LLM 142 either one at a time or all at once based on the configuration of the Ask AI 406. In this example, for the natural language query 414, the LLM 142 outputs to the virtual assistant server 150 the determined table operations in the JSON format as below:

---

TABLE intent - filter:

---

{"filter":{"title":"","op":"and","condition":[{"id":"citemth16","filtertype":"equals","type":"dropdown","filter":"beverages"}]}}"

---

---

TABLE sub-intent - sort:

---

{"sort":[{"id":"cunitse3d","columnname":"units sold","sort":"asc"}]}"

---

---

TABLE sub-intent - aggregation:

---

{"column":[{"id":"cunitse3d","field":"units sold","aggFunc":"sum"}]}"

---

In this example, the data processing engine 172 first performs JSON data filtering on the JSON representation of the sales report 402 based on the JSON format corresponding to the filter table operation received from the LLM 142 and generates a new version of the sales report 402, i.e., filtered version of the sales report 402 (as described at step 308 of FIG. 3). Further, the data processing engine 172 performs JSON data sort on the JSON representation of the filtered version of the sales report 402, based on the JSON format corresponding to the sort table operation received from the LLM 142, and updates the filtered version of the sales report 402 to generate a sorted filtered version of the sales report 402 (as described at step 308 of FIG. 3). In this example, the updated version of the sales report 402, i.e., sorted filtered version of the sales report 402 is the final version of the sales report 402. Further, the data processing engine 172 performs the last table operation in the determined order, i.e., JSON data aggregation on the JSON representation of the updated version of the sales report 402, based on the JSON format corresponding to the aggregation table operation received from the LLM 142, and determines a response 424—"The total number of units sold for the item type beverages is 2,208,169", to the natural language query 414 (as described at step 310 of FIG. 3). Subsequently, as illustrated in FIG. 4C, the data processing engine 172 outputs the response 424 to the user in the Ask AI user interface 408 (as described at step 312 of FIG. 3).

Further, as illustrated at view 416 of FIG. 4C, along with the response 424, the final version of the sales report 402, i.e., the sorted filtered version of the sales report 402 may also be presented to the user in the Ask AI user interface 408 by the data processing engine 172. Further, as illustrated at 418 of FIG. 4C, the data processing engine 172 may also display an indication to the user that there are additional records present in the view 416. As described above, the view 416 is stored as part of the session context of the ongoing interaction session. Further, the user at the user device 110(1) may clear the session context by using an option—"clear context 426", as illustrated in FIG. 4C. Once the user at the user device 110(1) selects the option—"clear context 426", the conversation engine 164 clears the session context stored for the ongoing interaction session (i.e., all query suggestions that are presented to the user, all generated versions of the sales report 402, all natural language queries provided by the user, and all the responses presented to the user), so that the user may start a new interaction with the sales report 402 afresh.

Figure 4D:
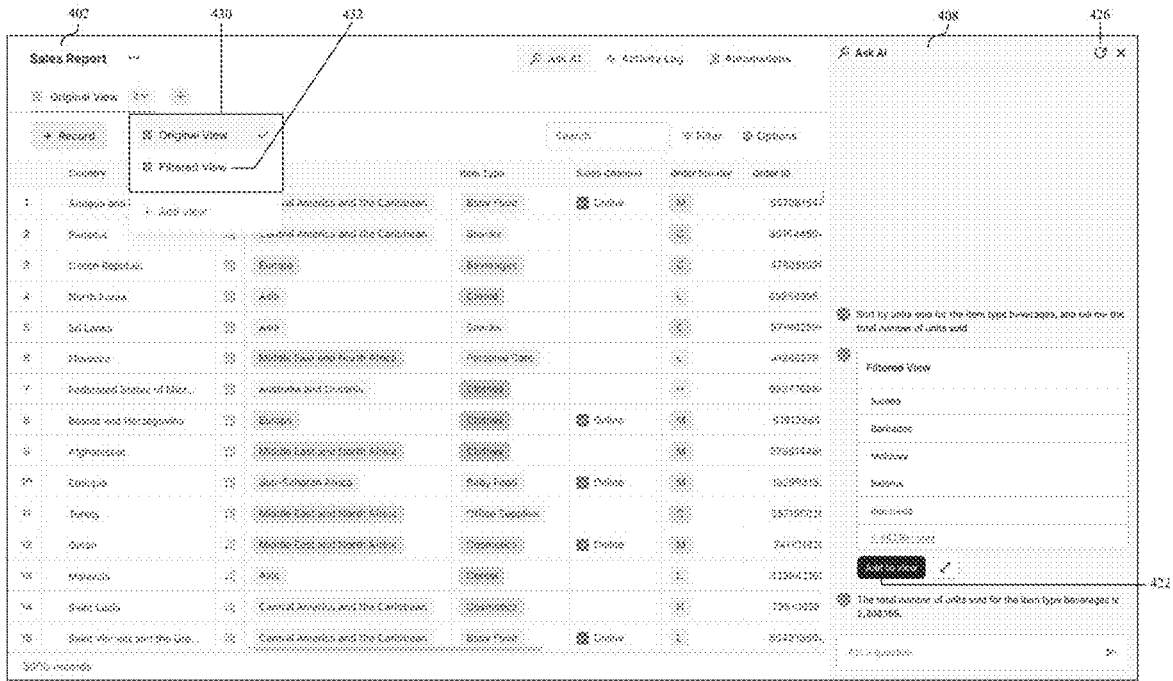

Further, the user at the user device 110(1) may expand the view 416 using an option—expand 420. Once the user at the user device 110(1) selects the option—expand 420, the data processing engine 172 presents an expanded view 428 of the view 416 of the sales report 402 to the user via the web browser in the user GUI 112, as illustrated in FIG. 4D. Further, the user at the user device 110(1) may save the final version of the sales report 402 to data table views for later viewing and/or interaction using an option—"add to view 422", as illustrated in FIGS. 4C and 4D. As illustrated in FIG. 4E, once the user at the user device 110(1) selects the option—"add to view 422", the data processing engine 172 may save and add the final version of the sales report 402 to the data table views 430 as a selectable view 432, which the user may use any time later to view and interact.

Although not illustrated in the figures, based on the natural language queries received from the users, the one or more responses provided to the users by the virtual assistant server 150 may comprise pivot table(s), pivot chart(s), or any other data visualization chart(s) (e.g., bar chart, line chart, pie chart, etc.). Further, when the response provided by the virtual assistant server 150 to the natural language query is of chart type, for example, a pie chart, the user may be provided with an option in the user interface of the table virtual assistant 162 to transform the pie chart to any other chart type. In this example, when the user selects any other chart type (e.g., pie chart) to transform, the data processing engine 172 may make a function call corresponding to a library that may generate a pie chart.

In accordance with the methods, systems, and non-transitory computer-readable mediums described above, by leveraging an LLM and prompt chaining for: understanding the natural language queries of the user; determining intent(s) and/or sub-intent(s) of the natural language queries; and determining the table operation(s) to be performed on the data table to respond to the natural language queries, the virtual assistant server may output coherent and contextually relevant responses to the user. Further, while performing the above disclosed examples of this technology, the virtual assistant server shares only the metadata of the data table with the LLM instead of sharing the entire data table, thus ensuring data security for the enterprise(s) and/or users. Further, the above disclosed examples of this technology enable the users to efficiently interact with the data tables and receive responses in different formats such as, for example, natural language text, audio, data table view, pivot table, or charts (e.g., pie chart, bar chart, line chart, etc.), although the users may receive the responses in other types and/or numbers of formats in other examples. Further, as the conversation engine is storing and managing the session context for every user interaction with the data table, the responses provided to the user will be contextually relevant. Additionally, complex calculations and/or table operations such as, for example, pivot table, aggregations, or charts may be performed conversationally. The above described examples of this technology for conversationally interacting with data tables and performing table operations and data table analysis, will drastically reduce the time consumed by the users when compared to manually performing table operations and data table analysis.

Having thus described the basic concept of the invention, it will be rather apparent to those skilled in the art that the foregoing detailed disclosure is intended to be presented by way of example only and is not limiting. Various alterations, improvements, and modifications will occur and are intended for those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, therefore, is not intended to limit the claimed processes to any order except as may be specified in the claims. Accordingly, the invention is limited only by the following claims and equivalents thereto.

What is claimed is:

1. A method implemented by a virtual assistant server, the method comprising:

receiving from a user device, a natural language query targeted at a data table hosted at a user repository as part of an interaction session between the user device and the virtual assistant server;

determining one or more table intents or one or more table sub-intents from the natural language query, wherein the table intents or the table sub-intents of the natural language query are determined by providing to a natural language processing (NLP) model an intent determination prompt comprising: metadata of the data table; the natural language query; one or more instructions to the NLP model to determine the table intents or the table sub-intents; and one or more examples disclosing how to determine the table intents or the table sub-intents;

determining one or more table operations to execute on the data table based on the determined table intents or table sub-intents, wherein the one or more table operations are determined by providing one or more follow-up prompts to the NLP model, and wherein the follow-up prompts corresponding to the table intents are prioritized over the follow-up prompts corresponding to the table sub-intents while providing the follow-up prompts to the NLP model;

iteratively executing each of the determined table operations on the data table, wherein a final version of the data table results after completion of one or more of the iteratively executed determined table operations;

determining a response to the natural language query based on the final version of the data table; and outputting the determined response to the natural language query to the user device.

2. The method of claim 1, further comprising:
parsing the data table;
determining metadata of the data table comprising: column names, column identifiers, and column types;
generating a structured data representation of the data table; and
storing the metadata and the structured data representation of the data table in the user repository.

3. The method of claim 1, wherein each of the one or more follow-up prompts to the NLP model comprises:
the natural language query;
metadata of the data table;
one or more examples disclosing how to determine the table operation for the table intent or the table sub-intent to which the follow-up corresponds to; and
one or more instructions to the NLP model to determine the table operation for the table intent or the table sub-intent to which the follow-up corresponds to.

4. The method of claim 1, wherein the natural language query is a selection received from the user device from one or more query suggestions, and wherein the one or more query suggestions are provided by the virtual assistant server to the user device upon receiving an indication from the user device to conversationally interact with the data table.

5. The method of claim 4, wherein the one or more query suggestions are received from a natural language processing (NLP) model based on a suggestion prompt provided to the NLP model by the virtual assistant server, and wherein the suggestion prompt comprises: metadata of the data table; and one or more instructions to the NLP model to generate the one or more query suggestions.

6. The method of claim 1, wherein each of the determined table operations is executed on a structured data representation of the data table which is iteratively updated with one or more of the executions.

7. A virtual assistant server comprising:
one or more processors; and
a memory coupled to the one or more processors which are configured to execute programmed instructions stored in the memory to:
receive from a user device, a natural language query targeted at a data table hosted at a user repository as part of an interaction session between the user device and the virtual assistant server;
determine one or more table intents or one or more table sub-intents from the natural language query, wherein the table intents or the table sub-intents of the natural language query are determined by providing to a natural language processing (NLP) model an intent determination prompt comprising: metadata of the data table; the natural language query; one or more instructions to the NLP model to determine the table intents or the table sub-intents; and one or more examples disclosing how to determine the table intents or the table sub-intents;
determine one or more table operations to execute on the data table based on the determined table intents or table sub-intents, wherein the one or more table operations are determined by providing one or more follow-up prompts to the NLP model, and wherein the follow-up prompts corresponding to the table intents are prioritized over the follow-up prompts corresponding to the table sub-intents while providing the follow-up prompts to the NLP model;
iteratively execute each of the determined table operations on the data table, wherein a final version of the data table results after completion of one or more of the iteratively executed determined table operations;
determine a response to the natural language query based on the final version of the data table; and
output the determined response to the natural language query to the user device.

8. The virtual assistant server of claim 7, the one or more processors are further configured to:
parse the data table;

determine metadata of the data table comprising: column names, column identifiers, and column types;

generate a structured data representation of the data table; and store the metadata and the structured data representation of the data table in the user repository.

9. The virtual assistant server of claim 7, wherein each of the one or more follow-up prompts to the NLP model comprises:

the natural language query;

metadata of the data table;

one or more examples disclosing how to determine the table operation for the table intent or the table sub-intent to which the follow-up corresponds to; and one or more instructions to the NLP model to determine the table operation for the table intent or the table sub-intent to which the follow-up corresponds to.

10. The virtual assistant server of claim 7, wherein the natural language query is a selection received from the user device from one or more query suggestions, and wherein the one or more query suggestions are provided by the virtual assistant server to the user device upon receiving an indication from the user device to conversationally interact with the data table.

11. The virtual assistant server of claim 10, wherein the one or more query suggestions are received from a natural language processing (NLP) model based on a suggestion prompt provided to the NLP model by the virtual assistant server, and wherein the suggestion prompt comprises: metadata of the data table; and one or more instructions to the NLP model to generate the one or more query suggestions.

12. The virtual assistant server of claim 7, wherein each of the determined table operations is executed on a structured data representation of the data table which is iteratively updated with one or more of the executions.

13. A non-transitory computer-readable medium storing instructions which when executed by one or more processors, causes the one or more processors to:

receive from a user device, a natural language query targeted at a data table hosted at a user repository as part of an interaction session between the user device and the virtual assistant server;

determine one or more table intents or one or more table sub-intents from the natural language query, wherein the table intents or the table sub-intents of the natural language query are determined by providing to a natural language processing (NLP) model an intent determination prompt comprising: metadata of the data table; the natural language query; one or more instructions to the NLP model to determine the table intents or the table sub-intents; and one or more examples disclosing how to determine the table intents or the table sub-intents;

determine one or more table operations to execute on the data table based on the determined table intents or table sub-intents, wherein the one or more table operations are determined by providing one or more follow-up prompts to the NLP model, and wherein the follow-up prompts corresponding to the table intents are prioritized over the follow-up prompts corresponding to the table sub-intents while providing the follow-up prompts to the NLP model;

iteratively execute each of the determined table operations on the data table, wherein a final version of the data table results after completion of one or more of the iteratively executed determined table operations;

determine a response to the natural language query based on the final version of the data table; and output the determined response to the natural language query to the user device.

14. The non-transitory computer-readable medium of claim 13, further comprising instructions which when executed by the one or more processors, causes the one or more processors to:

parse the data table;

determine metadata of the data table comprising: column names, column identifiers, and column types;

generate a structured data representation of the data table; and store the metadata and the structured data representation of the data table in the user repository.

15. The non-transitory computer-readable medium of claim 13, wherein each of the one or more follow-up prompts to the NLP model comprises:

the natural language query;

metadata of the data table;

one or more examples disclosing how to determine the table operation for the table intent or the table sub-intent to which the follow-up corresponds to; and one or more instructions to the NLP model to determine the table operation for the table intent or the table sub-intent to which the follow-up corresponds to.

16. The non-transitory computer-readable medium of claim 13, wherein the natural language query is a selection received from the user device from one or more query suggestions, and wherein the one or more query suggestions are provided by the virtual assistant server to the user device upon receiving an indication from the user device to conversationally interact with the data table.

17. The non-transitory computer-readable medium of claim 16, wherein the one or more query suggestions are received from a natural language processing (NLP) model based on a suggestion prompt provided to the NLP model by the virtual assistant server, and wherein the suggestion prompt comprises: metadata of the data table; and one or more instructions to the NLP model to generate the one or more query suggestions.

18. The non-transitory computer-readable medium of claim 13, wherein each of the determined table operations is executed on a structured data representation of the data table which is iteratively updated with one or more of the executions.

* * * * *